United States Patent
Paul et al.

(10) Patent No.: US 11,349,358 B2
(45) Date of Patent: May 31, 2022

(54) APPARATUS AND METHOD FOR AN INTERIOR PERMANENT MAGNET WITH ROTOR HYBRIDIZATION

(71) Applicant: Steering Solutions IP Holding Corporation, Saginaw, MI (US)

(72) Inventors: Subhra Paul, Saginaw, MI (US); Rakibul Islam, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 228 days.

(21) Appl. No.: 16/509,054

(22) Filed: Jul. 11, 2019

(65) Prior Publication Data

US 2021/0013753 A1    Jan. 14, 2021

(51) Int. Cl.
  *H02K 1/27*    (2022.01)
  *H02K 1/276*    (2022.01)
  *H02K 21/14*    (2006.01)
  *H02K 1/24*    (2006.01)
  *H02K 1/278*    (2022.01)
  *H02K 21/04*    (2006.01)

(52) U.S. Cl.
  CPC ............ *H02K 1/2766* (2013.01); *H02K 1/24* (2013.01); *H02K 1/278* (2013.01); *H02K 21/042* (2013.01); *H02K 21/14* (2013.01)

(58) Field of Classification Search
  CPC ............ H02K 1/27; H02K 1/24; H02K 21/04; H02K 21/14; H02K 1/276; H02K 21/042; H02K 1/278; H02K 1/2766; H02K 16/02; H02K 29/03
  See application file for complete search history.

(56) References Cited

U.S. PATENT DOCUMENTS

| | | | |
|---|---|---|---|
| 5,751,089 A * | 5/1998 | Stridsberg | H02K 1/185 310/266 |
| 6,771,000 B2 | 8/2004 | Kim | |
| 7,518,277 B2 | 4/2009 | Nemoto | |
| 8,487,494 B2 * | 7/2013 | Jurkovic | H02K 1/276 310/156.53 |
| 8,786,156 B2 | 7/2014 | Hino | |
| 8,884,485 B2 * | 11/2014 | Jurkovic | H02K 1/2766 310/156.53 |
| 9,935,531 B2 * | 4/2018 | Yomoda | H02K 15/03 |
| 2005/0121990 A1 | 6/2005 | Kaneko | |
| 2007/0096578 A1 * | 5/2007 | Jahns | H02K 21/14 310/156.53 |
| 2013/0069470 A1 * | 3/2013 | Jurkovic | H02K 1/2766 310/156.53 |
| 2013/0169097 A1 | 7/2013 | Saban | |
| 2013/0342043 A1 | 12/2013 | Liang et al. | |
| 2014/0035420 A1 | 2/2014 | Li | |

(Continued)

FOREIGN PATENT DOCUMENTS

JP    363140645 A    6/1988

*Primary Examiner* — Naishadh N Desai
(74) *Attorney, Agent, or Firm* — Dickinson Wright PLLC

(57) ABSTRACT

An interior permanent magnet machine includes a stator having electromagnetic windings. The machine also includes a rotor that is disposed concentrically with the stator and is disposed about a rotor axis, the rotor comprising a rotor core defined by a first rotor lamination that is arranged to receive a first magnet set according to a first rotor topology and a second magnet set according to a second rotor topology.

16 Claims, 2 Drawing Sheets

(56) References Cited

U.S. PATENT DOCUMENTS

| | | |
|---|---|---|
| 2016/0380492 A1 | 12/2016 | Kawasaki |
| 2017/0063188 A1 | 3/2017 | Lipo |
| 2017/0093237 A1 | 3/2017 | Tsuda |
| 2017/0201138 A1* | 7/2017 | Leonardi ................. H02K 1/04 |
| 2017/0229933 A1 | 8/2017 | Leonardi |
| 2019/0165628 A1* | 5/2019 | Paul ..................... H02K 21/024 |
| 2019/0348878 A1* | 11/2019 | Paul ...................... H02K 21/24 |

* cited by examiner

APPARATUS AND METHOD FOR AN INTERIOR PERMANENT MAGNET WITH ROTOR HYBRIDIZATION

BACKGROUND OF THE INVENTION

The present disclosure relates to an interior permanent magnet machine having a hybrid rotor topology.

An interior permanent magnet machine typically includes a stator having stator coil windings and a rotor having permanent magnets that cooperate with stator poles that are defined by the stator coil windings. The stator coil windings may be energized by an electrical current to provide rotor torque when the machine is acting as a motor. The interaction of an electromagnetic flux flow path created by the stator coil windings with a flux flow path created by the permanent magnets may be accompanied by harmonic waveform components that may induce motor torque fluctuations. These motor torque fluctuations may be manifested by torque ripple, increased cogging torque, or back EMF harmonics.

SUMMARY

According to one aspect of the disclosure, an interior permanent magnet machine includes a stator having electromagnetic windings. The machine also includes a rotor that is disposed concentrically with the stator and is disposed about a rotor axis, the rotor comprising a rotor core defined by a first rotor lamination that is arranged to receive a first magnet set according to a first rotor topology and a second magnet set according to a second rotor topology.

According to another aspect of the disclosure, a rotor for an interior permanent magnet machine includes a rotor core defined by a first rotor lamination that defines a first magnet pocket, a second magnet pocket, and a third magnet pocket, the first magnet pocket having a first edge that extends along a first axis, the second magnet pocket having a second edge that extends from the first edge along a second axis, the first axis being disposed in a non-parallel relationship with respect to the second axis, the third magnet pocket circumferentially offset from the first magnet pocket and the second magnet pocket, the third magnet pocket having an edge that extends along a third axis that is disposed in a non-parallel relationship with respect to the first axis and the second axis.

According to yet another aspect of the disclosure, an interior permanent magnet machine includes a stator having electromagnetic windings. The machine also includes a rotor that is disposed concentrically with the stator and is disposed about a rotor axis, the rotor comprising a rotor core defined by a first rotor lamination that is arranged to receive a first magnet set according to a first rotor topology and a second magnet set according to a second rotor topology, the rotor core having axial variation between the first magnet set of the first rotor topology and the second magnet set of the second rotor topology.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Electrification of various industries, such as automotive, aviation, marine, agricultural, residential, or the like may require the use of efficient motor drives. In order to provide more efficient motor drives, the motor drive may require higher torque density, as well as more robust retention mechanisms, should magnets be employed on a rotating body in a high torque dense machine.

Interior permanent magnet machines may offer significant torque density improvements as compared to surface permanent magnet machines. Interior permanent magnet machines may also have further benefits over surface permanent magnet machines such as: wider field weakening or constant power region, presence of reluctance torque along with alignment torque (e.g. overall higher torque density for same current density), better magnet retention, less risk of demagnetization, or less short circuit current, as well as additional benefits.

Existing interior permanent magnet machine topology may have some drawbacks that impact overall performance and efficiency of the interior permanent magnet machine such as: cogging torque, back-emf harmonics specially when used in a machine with ½ slot per pole per phase due to strong slot harmonics of 5th, 7th, 11th, and 13th orders, and torque ripple/ripple in shaft torque, as compared to a surface permanent magnet motor. Skewing is a well-known technique to reduce such fluctuations in torque. However, skewing results axial force pulsations. Skewing may also pose challenges in magnetizing the magnets in the rotor assembly in production environment. Furthermore the number of magnets in a rotor can be high with skewing and may pose a challenge due to magnet-to-magnet variations in dimensions and strengths. An interior permanent magnet machine employing a hybrid rotor topology is provided to overcome these drawbacks and provide a more efficient interior permanent magnet machine that reduces motor torque fluctuations.

The interior permanent magnet machine may be an interior permanent magnet synchronous machine that may be employed in applications requiring a compact, efficient, and high torque density interior permanent magnet machine.

Figure 1:
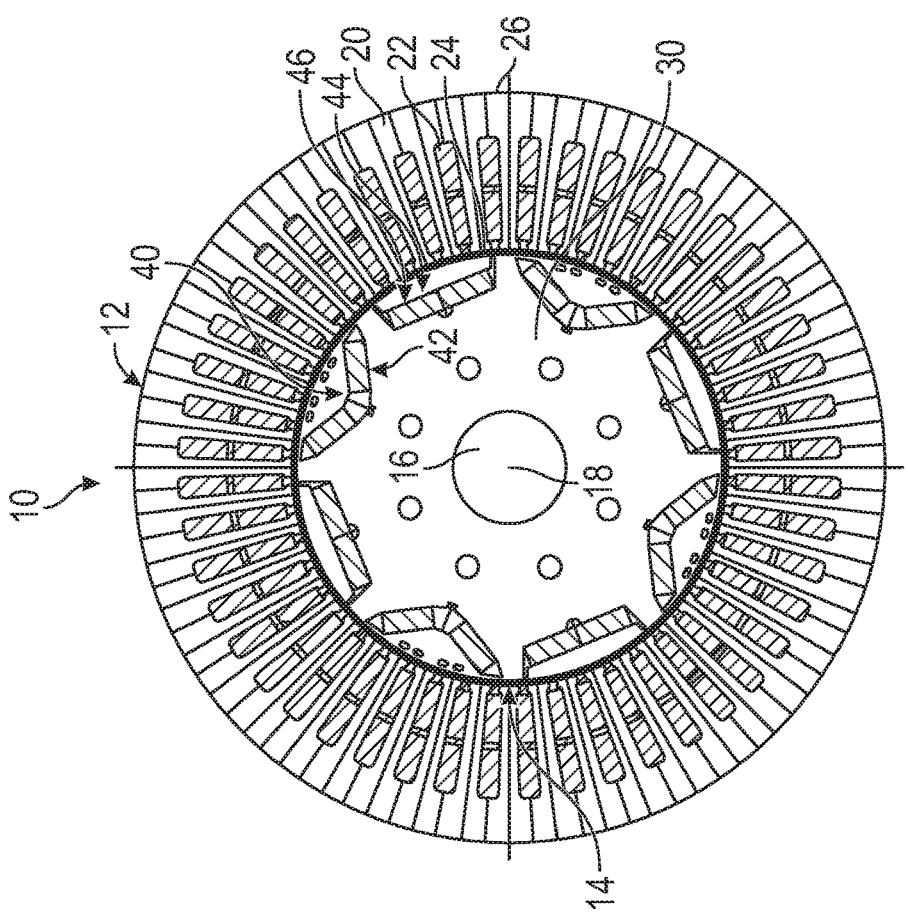
FIG. 1 is a cross section of a permanent magnet machine.

Referring to FIG. 1, an interior permanent magnet machine 10 is shown. The interior permanent magnet machine 10 includes a stator 12, a rotor or a rotor assembly 14 that is disposed concentric with the stator 12, and a rotor shaft 16 upon which the rotor assembly 14 is seated. The rotor shaft 16 extends along a rotor axis 18 (axis not shown in FIG). The stator 12 and the rotor assembly 14 are each disposed about, and extend along, the rotor axis 18. While in operation the stator and rotor assembly 14 may not remain in the same rotor axis 18 due to eccentricity.

The stator 12 includes a stator core 20 and electromagnetic windings 22, an inner stator periphery 24 and an outer stator periphery 26. The inner stator periphery 24 is disposed closer to the rotor axis 18 than the outer stator periphery 26. The electromagnetic windings 22 may be disposed proximate an inner stator periphery 24 and may be spaced apart from an outer stator periphery 26. The electromagnetic windings 22 may taper in a direction that extends from the outer stator periphery 26 towards the inner stator periphery 24 such that a width of each winding of the plurality of electromagnetic windings 22 decreases in a direction that extends from the outer stator periphery 26 towards the inner stator periphery 24. The electromagnetic windings 22 may taper in a direction that extends from the inner stator periphery 24 towards the outer stator periphery 26. The electromagnetic windings 22 may have a substantially constant cross-sectional form that extends between the inner stator periphery 24 and the outer stator periphery 26.

The rotor assembly 14 may be rotatably disposed within the stator 12 and may be disposed about the rotor shaft 16 such that the interior permanent magnet machine 10 is arranged as an interior rotor motor in some embodiments. The rotor assembly 14 may be disposed about the stator 12 such that the interior permanent magnet machine 10 is configured as an exterior rotor motor in some embodiments.

Figure 2:
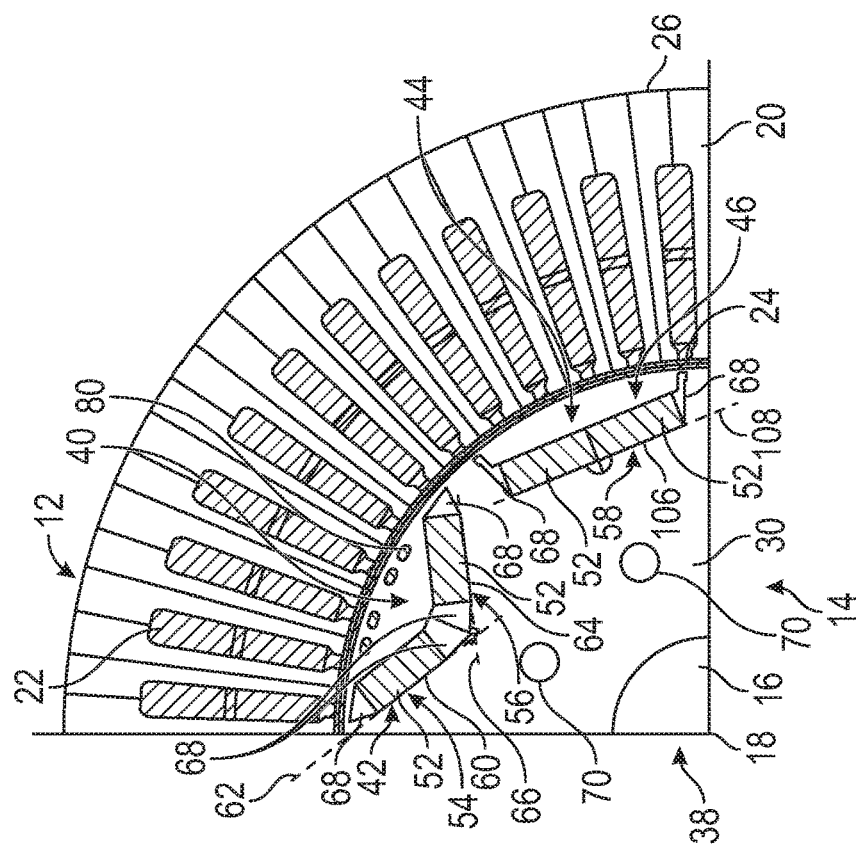
FIG. 2 is a cross section of a first rotor topology and a second rotor topology of a portion of the machine of FIG. 1.

Referring to FIG. 2, the rotor assembly 14 of the interior permanent magnet machine 10 includes a rotor core 30 defined by a first rotor lamination 38 that is arranged to receive a first magnet set 40 according to a first rotor topology 42 and a second magnet set 44 according to a second rotor topology 46. One pole of any pole-pair of the rotor assembly 14 is designed according to the first rotor topology 42 and the other pole is designed according to the second rotor topology 46. In the first rotor topology 42 a pair of magnets 52 may be arranged in a V-shape forming an angle that is less than 180 degrees. In the second rotor topology 46 one single magnet 52 may be placed near the surface of the rotor assembly 14. In another embodiment the second rotor topology 46 may include multiple magnets 52 with a 180 degree angle between them or in other words aligning multiple magnets 52 horizontally or in bar-shape in a pocket close to the surface of the rotor assembly 14. In the proposed technique there are two different rotor topologies with two adjacent poles. This technique is referred to as hybridization on a lamination.

The different rotor topologies may employ different magnet 52 or magnet pocket configurations such as variations of pole arc angle from one pole to an adjacent pole on the same rotor lamination. The first rotor topology 42 is defined by a first magnet pocket 54 and a second magnet pocket 56 that extends from the first magnet pocket 54. The first magnet pocket 54 includes a first edge 60 and the second magnet pocket 56 includes a second edge 64 that extends from the first edge 60. The first edge 60 extends along a first axis 62 that is disposed in a non-parallel relationship when compared to the second edge 64 which extends along a second axis 66. This variation in angle can improve cogging torque issues.

The second rotor topology 46 is defined by a third magnet pocket 58 that is circumferentially offset from the first magnet pocket 54 and the second magnet pocket 56. The third magnet pocket 58 includes an edge 106 that extends along a third axis 108 that is disposed parallel to, but not coplanar with, the rotor axis 18. The third axis 108 intersects at least one of the first axis 62 and the second axis 66.

The combination of the V-shaped interior permanent magnets 52 of the first rotor topology 42 with the Bar-shaped interior permanent magnets 52 of the second rotor topology 46 may achieve a significant reduction in the back EMF and cogging torque of the interior permanent magnet machine 10.

Further improvements of the performance of the dual rotor topology through cogging cancellation may be employed while simultaneously reducing back EMF harmonics. Flux barriers 80, pockets of nonmagnetic material 68, air pockets 70, or the like may be introduced into the rotor assembly 14. The flux barriers 80 are placed near the inner stator periphery 24 within the rotor core 30. In addition, flux barriers 80 may be near stator 12 outer periphery for external rotor motor (not shown). The flux barriers 80 and pockets of nonmagnetic material shape the flux density in the airgap, thus effecting the magnitude and harmonic content of cogging, back-EMF and torque ripple. In particular the flux barriers 80 shape the cogging and back-EMF of each of the V-shaped interior permanent magnets 52 and the Bar-shaped interior permanent magnets 52 so that the combined assembly has reduced cogging and back-EMF harmonics leading to reduced torque ripple.

Figure 3:
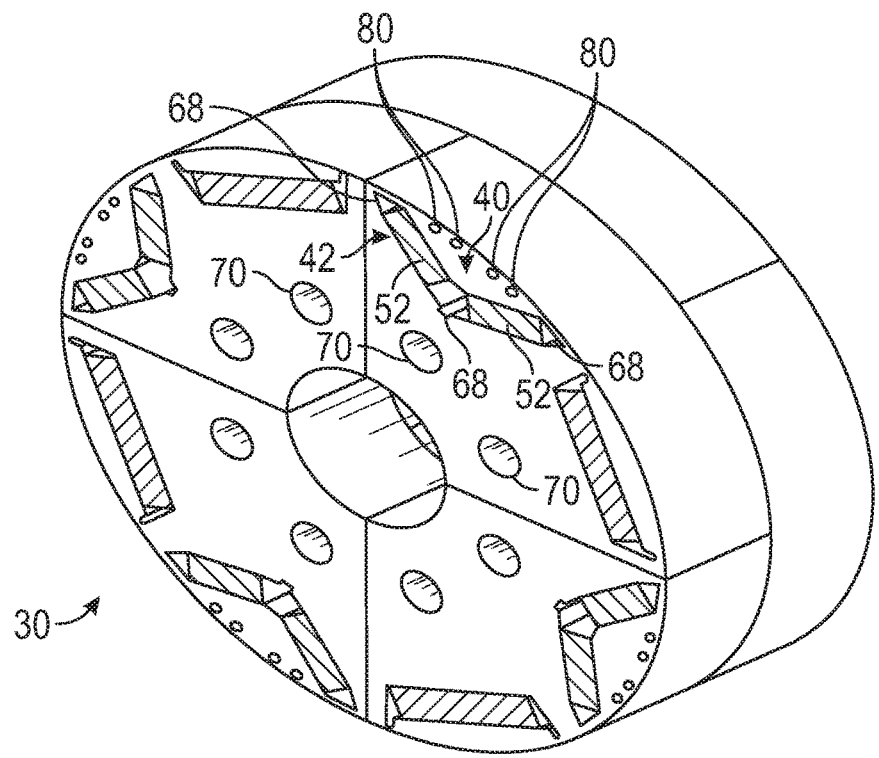
FIG. 3 is a cross section of rotor core without any axial variation between a first magnet set of a first rotor topology and a second magnet set of a second rotor topology.
Figure 4:
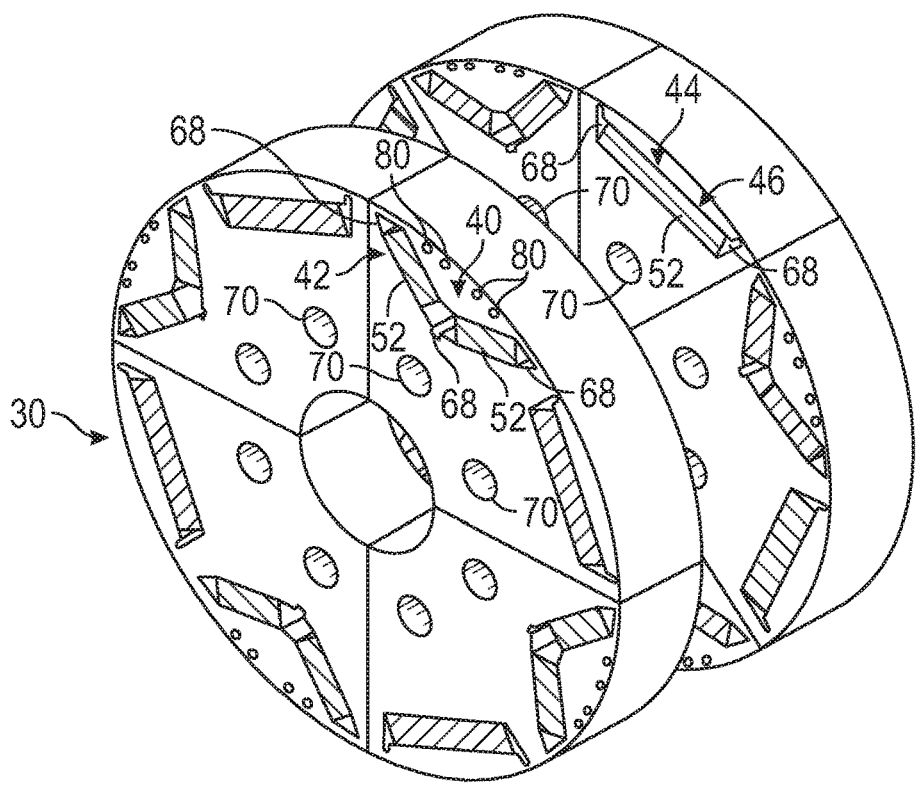
FIG. 4 is a cross section of a rotor core with axial variation between a first magnet set of a first rotor topology and a second magnet set of a second rotor topology.

Referring to FIG. 3 and FIG. 4, an embodiment is depicted where hybridization on a lamination is used with axial variation between the first magnet set 40 of the first rotor topology 42 and the second magnet set 44 of the second rotor topology 46. Axial variation means the V-shaped magnet 52 of the first magnet set 40 of the first rotor topology 42 is no longer axially aligned with the V-shaped magnet 52 of the second magnet set 44 of the second rotor topology 46. Instead, the first magnet set 40 of the first rotor topology 42 is arranged in a V-shape and is axially aligned with the second magnet set 44 of the second rotor topology 46 which is arranged in a bar-shape creating axial variation. In some embodiments the second rotor topology 46 may contain one magnet 52 or multiple magnets 52 placed in bar-shape. Axial variation is needed as the time period of a cogging cycle changes due to the hybridization nature of north and south pole due to the slot-pole combination of the machine. The slot-pole combination of the machine of FIG. 1 and FIG. 2 does not change the cogging cycle time period, hence axial variation for such slot-pole combination is not required.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments or combinations of the described

Having thus described the invention, it is claimed:

1. An interior permanent magnet machine comprising:
a stator having electromagnetic windings; and
a rotor that is disposed concentrically with the stator and is disposed about a rotor axis, the rotor comprising a rotor core at least partially defined by:
a first rotor lamination that is arranged to receive a first magnet set according to a first rotor topology and a second magnet set according to a second rotor topology; and
a second rotor lamination located axially adjacent to the first rotor lamination and is arranged to receive a third magnet set according to the second rotor topology and a fourth magnet set according to the first rotor topology, wherein the first magnet set and the third magnet set are radially and circumferentially aligned and the second magnet set and the fourth magnet set are radially and circumferentially aligned.

2. The interior permanent magnet machine of claim 1, wherein coggings of the first rotor topology and the second rotor topology are 180 degrees out of phase with each other.

3. The interior permanent magnet machine of claim 1, wherein the first rotor topology is defined by a first magnet pocket and a second magnet pocket that extends from the first magnet pocket.

4. The interior permanent magnet machine of claim 3, wherein the first magnet pocket includes a first edge and the second magnet pocket includes a second edge that extends from the first edge.

5. The interior permanent magnet machine of claim 4, wherein the first edge extends along a first axis and the second edge extends along a second axis, wherein the first axis and the second axis are disposed in a non-perpendicular and non-parallel relationship with respect to each other.

6. The interior permanent magnet machine of claim 5, wherein the second rotor topology is defined by a third magnet pocket that is circumferentially offset from the first magnet pocket and the second magnet pocket.

7. The interior permanent magnet machine of claim 6, wherein the third magnet pocket includes an edge that extends along a third axis that intersects at least one of the first axis and the second axis.

8. The interior permanent magnet machine of claim 1, wherein the first rotor topology of the first magnet set is arranged as a V-shaped interior permanent magnet rotor segment, the second rotor topology of the second magnet set is arranged as a Bar-shaped interior permanent magnet rotor segment.

9. The interior permanent magnet machine of claim 1, wherein the rotor includes at least one flux barrier, the flux barrier being placed near the inner stator periphery within the rotor core.

10. The interior permanent magnet machine of claim 1, wherein the rotor includes at least one pocket, the pocket being within the rotor core.

11. A rotor for an interior permanent magnet machine comprising:
a rotor core at least partially defined by a first rotor lamination that defines a first magnet pocket, a second magnet pocket, and a third magnet pocket, the first magnet pocket having a first edge that extends along a first axis, the second magnet pocket having a second edge that extends from the first edge along a second axis, the first axis being disposed in a non-parallel relationship with respect to the second axis, the third magnet pocket circumferentially offset from the first magnet pocket and the second magnet pocket, the third magnet pocket having an edge that extends along a third axis that is disposed in a non-parallel relationship with respect to the first axis and the second axis.

12. The rotor of claim 11, further comprising a flux barrier disposed on an outer surface of the rotor core.

13. The rotor of claim 11, wherein the third axis bisects at least one of the first axis and the second axis.

14. The rotor of claim 11, wherein the first rotor lamination further defines a first nonmagnetic pocket that extends from the first magnet pocket towards an outer surface of the rotor core and a second nonmagnetic pocket that extends from the second magnet pocket towards the outer surface of the rotor core.

15. The rotor of claim 14, wherein the first rotor lamination further defines a third nonmagnetic pocket that extends from the third magnet pocket towards the second magnet pocket.

16. An interior permanent magnet machine comprising:
a stator having electromagnetic windings; and
a rotor that is disposed concentrically with the stator and is disposed about a rotor axis, the rotor comprising a rotor core at least partially defined by a first rotor lamination and a second rotor lamination located axially adjacent to the first rotor lamination, wherein the first rotor lamination includes a V-shaped interior permanent magnet rotor segment disposed therein, wherein the second rotor lamination includes a Bar-shaped interior permanent magnet rotor segment disposed therein, wherein the V-shaped interior permanent magnet rotor segment and the Bar-shaped interior permanent magnet rotor segment are circumferentially and radially aligned.

* * * * *